United States Patent [19]
Ishijima et al.

[11] 4,419,134
[45] Dec. 6, 1983

[54] ORGANIC PHOSPHORIC ESTER CONTAINING WATER-DISPERSIBLE ALUMINUM PASTE AS FOAMING AGENT IN LIGHT-WEIGHT FOAMED CONCRETE

[75] Inventors: Shizuo Ishijima, Mishima; Takeshi Kiritani, Yokohama; Yukio Hayashi, Fujinomiya, all of Japan

[73] Assignee: Asahi Kasei Kogyo Kabushiki Kaisha, Osaka, Japan

[21] Appl. No.: 394,123

[22] Filed: Jul. 1, 1982

Related U.S. Application Data

[62] Division of Ser. No. 152,294, May 22, 1980, Pat. No. 4,350,535.

[30] Foreign Application Priority Data

May 28, 1979 [JP] Japan .................................. 54-65007

[51] Int. Cl.$^3$ ................................................ C04B 1/00
[52] U.S. Cl. ..................................... 106/87; 106/120; 106/314
[58] Field of Search ................. 106/87, 88, 86, 314, 106/290, 291

[56] References Cited

U.S. PATENT DOCUMENTS

| 4,083,729 | 4/1978 | Yamada et al. | 106/88 |
| 4,138,270 | 2/1979 | Ishijima et al. | 106/290 |

FOREIGN PATENT DOCUMENTS

| 52-3624 | 1/1977 | Japan | 106/85 |

*Primary Examiner*—Helen M. McCarthy
*Attorney, Agent, or Firm*—Finnegan, Henderson, Farabow, Garrett & Dunner

[57] ABSTRACT

Described is a water-dispersible paste composition of metal powder which contains:
(a) metal powders, and;
(b) from 0.1 to 20% by weight, based on the weight of the metal powders, of at least one organic phosphoric ester having a general formula [I]:

$$R-(OA)_m-O-\overset{\overset{\displaystyle R^1-O}{|}}{\underset{\underset{\displaystyle R^2-O}{|}}{P}}=O \qquad [I]$$

wherein R represents an alkyl group having 6 to 24 carbon atoms, an alkenyl group having 6 to 24 carbon atoms or an aryl group containing at least one alkyl substituent having 6 to 24 carbon atoms or at least one alkenyl substituent having 6 to 24 carbon atoms, A represents an alkylene group having 2 to 4 carbon atoms, m represents an integer of from 0 to 20, and $R^1$ and $R^2$ independently represent hydrogen, an alkyl group having 1 to 24 carbon atoms, an alkenyl group having 2 to 24 carbon atoms, an aryl group having 6 to 24 carbon atoms or $R-(OA)_m$ (R, A and m are the same as set forth above). This aqueous paste composition of metal powders has an excellent stability in aqueous coating compositions and is capable of controlling the foam initiating time and the expansion rate of cement mortar.

9 Claims, 2 Drawing Figures

ORGANIC PHOSPHORIC ESTER CONTAINING WATER-DISPERSIBLE ALUMINUM PASTE AS FOAMING AGENT IN LIGHT-WEIGHT FOAMED CONCRETE

This is a division of application Ser. No. 152,294 filed May 22, 1980 now U.S. Pat. No. 4,350,535.

The present invention relates to a water-dispersible paste composition of metal powders. More specifically, it relates to a water-dispersible paste composition of metal powders which improves the long-term storage stability of, for example, aqueous coating compositions and aqueous adhesives containing the same as a metallic pigment, or which imparts an improved initial foam retarding effect to light-weight foamed concrete containing the same, especially an aluminum paste composition, as a foaming agent.

There has been considerable interest in recent years directed towards the use of aqueous coating compositions in the paints and varnishes. This is because, since aqueous coating compositions do not contain any organic solvent, organic solvents, which are valuable materials, are not wastefully used and pollution problems due to the use of organic solvents can be eliminated. Metallic powder pigments used, heretofore, in the aqueous coating compositions are compositions that contain, as a surface treating agent, saturated or unsaturated fatty acids, such as stearic acid and oleic acid, and the derivatives thereof, and also contain a surface active agent as a water-dispersing agent. However, these water-dispersible metallic powder pigments have disadvantages in that the storage stability thereof in the aqueous coating compositions is low. For this reason, the properties of the coating compositions are greatly impaired due to the facts that the dispersibility of the pigments becomes worse during storage and that a large amount of gases is generated during storage.

On the other hand, also in the case where metallic powder pigments are used as a foaming agent in the manufacture of light-weight foamed concrete, water-dispersible paste compositions of metal powders, which are free from organic solvents and which can be used for adjusting the foam initiating time and the expansion rate during expansion molding or foam molding, are desired in the art from the point of view of environmental pollution and also from the technical point of view.

Accordingly, an object of the present invention is to obviate the afore-mentioned disadvantages of the prior arts and to provide a water-dispersible paste composition of metal powders which has an excellent stability in aqueous coating compositions.

Another object of the present invention is to provide a water-dispersible paste composition of metal powders which can be used for adjusting the foam initiating time and the expansion rate.

Other objects and advantages of the present invention will be apparent from the description set forth hereinbelow.

In accordance with the present invention, there is provided a water-dispersible paste composition of metal powders comprising:
(a) metal powders, and;
(b) from 0.1 to 20% by weight, based on the weight of the metal powders, of at least one organic phosphoric ester having a general formula [I]:

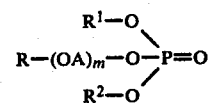

wherein R represents an alkyl group having 6 to 24 carbon atoms, an alkenyl group having 6 to 24 carbon atoms or an 6 to 24 carbon atoms or at least one alkenyl substituent having 6 to 24 carbon atoms, A represents an alkylene group having 2 to 4 carbon atoms, m represents an integer of from 0 to 20, and $R^1$ and $R^2$ independently represent hydrogen, an alkyl group having 1 to 24 carbon atoms, an alkenyl group having 1 to 24 carbon atoms, an aryl group having 6 to 24 carbon atoms or $R-(OA)_m$ (R, A and m are the same as set forth above).

The present invention will be better understood from the description set forth below with reference to the accompanying drawings in which.

Figure 1:
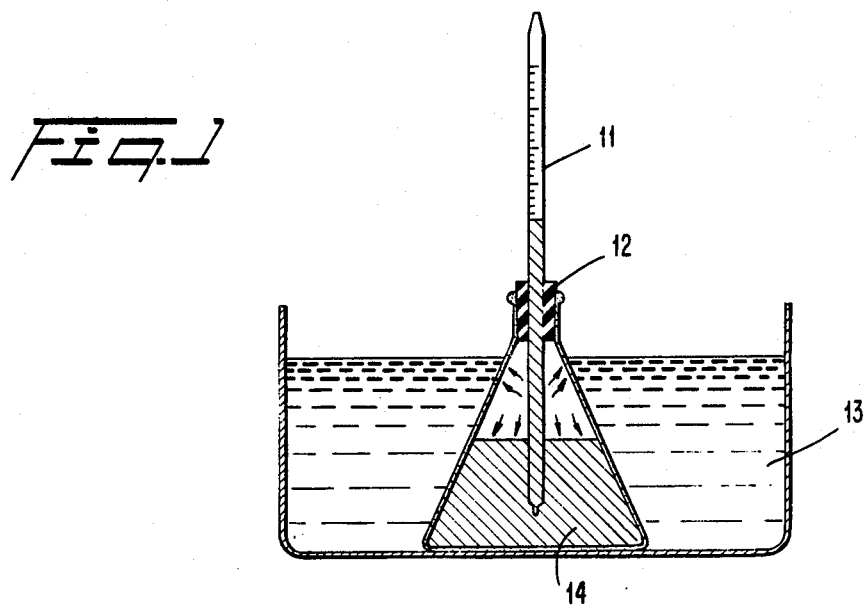
FIG. 1 is a schematic sectional view of an instrument used for the water stability test described hereinbelow.

The metal powders used in the present invention include powders of aluminum, copper, zinc, brass, and other metals and alloys having malleability. Examples of the other metals and alloys having malleability are nickel, magnesium, aluminum-copper alloy, aluminum-zinc alloy, aluminum-nickel alloy, aluminum-magnesium alloy and the like. These metal powders can be used alone or in any combination thereof. The metal powders are preferably in the form of flakes. The most preferable metal powders are aluminum flakes. The thickness of the flakes is preferably within the range of from 0.01 to 5 microns and, more prefereably, within the range of from 0.1 to 1 micron. Although the length or width of the metal powders used in the present invention is not specifically limited, the length or width is generally less than approximately 149 microns and, more preferably, less than approximately 44 microns. Generally speaking, larger powders are not preferable because they adversely affect the coating appearance. Preferably, the size of the metal powders is such that, when the metal powders are sieved through a screen having an opening size of 149 microns, the sieving residue is 0.5% or less. Although there is no critical limitation in the purity of the metal powders, metal powders having a purity of 99.5% or more are generally used for coating compositions.

The organic phosphoric esters used in the present invention have a general formula [I]:

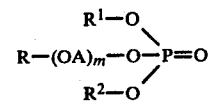

wherein R represents an alkyl group having 6 to 24, preferably 12 to 18, carbon atoms, an alkenyl group having 6 to 24, preferably 12 to 18, carbon atoms or an aryl group containing at least one alkyl substituent having 6 to 24, preferably 12 to 18, carbon atoms or at least one alkenyl substituent having 6 to 24, preferably 12 to 18, carbon atoms, A represents an alkylene group having 2 to 4, preferably 2 to 3, carbon atoms, m represents an integer of from 0 to 20, preferably from 0 to 10, more preferably from 2 to 8, and R¹ and R² independently represent hydrogen, an alkyl group having 1 to 24 carbon atoms, an alkenyl group having 1 to 24 carbon atoms, an aryl group having 6 to 24 carbon atoms or R—(OA)$_m$ (R, A and m are the same as set forth above).

Preferable examples of the alkyl group or the alkenyl group contained in R, R¹ and R² of the general formula [I] are hexyl, heptyl, octyl, nonyl, decyl, undecyl, lauryl, tridecyl, cetyl, stearyl, oleyl, hexadecyl, docosyl and tetracosyl. Preferable examples of the aryl group contained in R, R¹ and R² of the general formula [I] are octylphenyl, nonylphenyl, dodecylphenyl, dinonylphenyl, cumenyl, mesityl, tolyl, xylyl, biphenyl, naphthyl, anthryl, phenanthyl. Preferable examples of the group A of the general formula [I] are ethylene and propylene.

Typical examples of the organic phosphoric esters having as R of the general formula [I], an alkyl group are hexyl phosphate, heptyl phosphate, octyl phosphate, nonyl phosphate, decylphosphate, undecyl phosphate, lauryl phosphate, tridecyl phosphate, myristyl phosphate, pentadecyl phosphate, nonadecyl phosphate, eicosyl phosphate, heneicosyl phosphate, docosyl phosphate, tricosyl phosphate, tetracosyl phosphate, 2-methyl-7-ethyl-4-undecyl phosphate, 2,6,8,-trimethylnonyl phosphate and the addition products thereof with ethylene oxide, propylene oxide, butylene oxide and the like.

Typical examples of the organic phosphoric esters having, as R of the general formula [I], an alkenyl group are 4-dodecynyl phosphate, cis-9-octadecynyl phosphate, 3-methyl-2-nonyl phosphate, 5,9-dimethyl-2-decynyl phosphate and the addition product thereof with ethylene oxide, propylene oxide, butylene oxide and the like.

Typical examples of the organic phosphoric esters having, as R of the general formula [I], an aryl group are octylphenol phosphate, nonylphenol phosphate, dodecylphenyl phosphate and the addition product thereof with ethylene oxide, propylene oxide, butylene oxide and the like.

The phosphoric esters used in the present invention may be mono-, di- or tri-esters. These phosphoric esters can be used alone or in any combination thereof.

Furthermore, since the organic phosphoric esters are acidic in the aqueous solutions, the pH of the water-dispersible aqueous paste composition of the present invention can be adjusted to 3 through 9 by the addition of inor or organic basic substances, such as, ammonium hydroxide, sodium hydroxide, potassium hydroxides, dibutyl amine, triethyl amine, monoethanol amine, diethanol amine, triethanol amine and morpholine.

The present inventors have found that, in the case where 0.1 to 20% by weight, preferably 1 to 10% by weight, of, based on the weight of the metal powders, the above mentioned organic esters is incorporated into water-dispersible compositions of the metal powders, the stability of the metal powders in aqueous coating compositions can be remarkably improved and the foam initiating time and the expansion rate of, for example, light-weight foamed concrete can be readily controlled. Especially when aluminum powders are used, as a foaming agent, in the manufacture of light-weight foamed concrete, the water-dispersible paste composition of the present invention can impart an excellent retention effect of initial foaming or bubbling to the light-weight foamed concrete. Although the action of the above-mentioned organic phosphoric esters in the present paste composition is not fully understood, it would seem that the organic phosphoric esters are adsorbed on the surfaces of the metal powders, whereby the reaction or interaction of the metal powders is depressed and the surfaces of the metal powders are protected.

In the case where the amount of the organic phosphoric esters in the paste compositions is less than 0.1% by weight, based on the weight of the metal powders, the above mentioned surface protection effect is not fully exhibited. Contrary to this, in the case where the amount of the organic phosphoric esters in the paste compositions is more than 20% by weight, based on the weight of the metal powders, the water resistance of the coatings derived from the aqueous coating compositions containing the paste composition tends to be decreased.

The addition of the organic phosphoric esters to the metal powders can be carried out in any conventional manner.

In general, metal flakes are produced by a so-called wet type milling or grinding process or a so-called dry type milling or grinding process. In the wet type milling process metal is charged, together with lubricant, which is used for increacing milling efficiency, into a conventional mill, such as, a ball mill and is milled in an organic solvent. In the dry type milling process metal is milled in the presence of the lubricant under, for example, a nitrogen atmosphere. As a lubricant, saturated or unsaturated fatty acids, fatty acid amines (or aliphatic amines), the metal salts of fatty acids and the like are used. These compounds serve as a surface treating agent, which is absorbed on the surface of the metal powders to therey protect the surfaces of the metal powders. The organic phosphoric esters used in the present invention can be added to the metal powders in lieu of or together with the fatty acids or the derivatives thereof.

Alternatively, the organic phosphoric esters used in the present invention can be added, together with water and surface active agents, to the metal powders which were previously surface-treated in a manner as set forth above.

The surface active agents which are optionally used for imparting water-dispersibility to the paste composition of the metal powders can be any conventional surface ective agents. However, from a point of view of the storage stability of the paste composition, the use of nonionic surface active agents is preferable. Typical examples of the nonionic surface active agents optionally used in the present invention are polyoxyethylene alkyl ethers, polyoxyethylene alkylphenol ethers, polyethylene glycol fatty acid esters, sorbitan fatty acid esters, fatty acid alkanol amides, block copolymers of ethylene oxide and propylene oxide and the like. These nonionic surface active agents can be added to the metal powders, together with the above mentioned organic phosphoric esters and a dispersing medium (e.g. water), when the paste compositions of the present invention are prepared. Although there is no limitation in the amount of the surface active agents when they are incorporated into the paste composition of the present invention, the surface active agents are optionally used in the range of from approximately 0.1 to approximately 20% by weight, preferably from 1 to 10% by weight, based on the weight of the metal powders.

The metal powders and the organic phosphoric acids and, optionally, the surface active agents are dispersed in pasting mediums to thereby form the water-dispersible paste compositions of the metal powders according to the present invention. The pasting mediums used in the present invention inlcude, for example, water, ethyl cellosolve, butyl cellosolve, iso-propyl alcohol, iso-butyl alcohol and the like.

The content of the pasting medium in the paste composition of the present invention is not critical, but the pasting medium is used in an amount sufficient to make the composition pasty. Generally speaking, the pasting medium is used in an amount of approximately 5 to 50% by weight, based on the weight of the metal powders.

As mentioned hereinabove, the water-dispersible compositions according to the present invention contain, as an essential constituent, the metal powders and the organic phosphoric esters in the pasting medium, and also contain, as an optional constituent, the surface active agents and the other conventional additives known in the art, such as lubricant, anti-setting agent, anti-skinning agent and the like.

According to the present invention, in the case where the water-dispersible paste compositions of the present invention are used, as a pigment, in aqueous coating compositions: (i) the metal powders are dispersed in an excellent state in the aqueous coating compositions; (ii) the generation of hydrogen gas and the agglomeration of the pigment do not occur during long-term storage, and; (iii) the coating compositions are chemically stable and no substantial change in the properties of the coating composition is observed during long-term storage.

According to the present invention, in the case where the water-dispersible paste compositions of the present invention are used, as a foaming agent, in light-weight foamed concrete, the foam initiating time and the expansion rate during the expansion molding can be freely controlled by the addition amount of the organic phosphoric ester based on the aluminum paste composition.

The present invention will be further illustrated by, but is not limited to, the following examples, in which all parts and percentages are expressed on a weight basis unless otherwise specified.

EXAMPLE 1 AND COMPARATIVE EXAMPLE 1

A mixture of 10 kg of particulate aluminum having an average particle size of approximately 80 microns and 10 kg of mineral spirit having a viscosity of approximately 1.17 Cps at 20° C. and containing 5% stearic acid was charged into a ball mill and, then, subjected to a ball milling for 8 hours. The milled mixture was diluted with 20 kg of mineral spirit and, then, charged into a slurry tank. This mixture was filtered with a filter press. The resultant filter press cake contained 95% of a heating residue and 5% of mineral spirit. The sieving residue of the aluminum powder in the filter press cake was less than 0.1% when the aluminum powder was sieved through a screen having an opening size of 149 microns.

To 100 parts of the filter press cake thus obtained, various kinds of organic phosphoric esters and nonionic surface active agents, each listed in Table 1 below, were added in the amounts set forth in Table 1 below and, then, water was added thereto in such an amount that a heating residue of the mixture was 65%. The mixtures were, then, uniformly kneaded at a temperature of 60° C. for approximately 4 hours. Thus, aqueous aluminum paste compositions were obtained.

As a comparative example, an aqueous aluminum paste composition having a heating residue of 65% was prepared in a manner as described above, except that diammonium hydrogenphosphate was used in lieu of the organic phosphoric ester.

The aqueous aluminum paste compositions thus obtained were examined to determine water dispersibility, water stability and long-term storage stability. Furthermore, the properties of the aqueous coating compositions and coatings derived therefrom were also tested when the aqueous aluminum paste compositions were incorporated into the aqueous coating compositions. The results are summarized in Table 1 below.

The test procedures used were as follows.

Property of Aluminum Paste

(1) Water Dispersibility 3 g of each sample was collected in a 50 ml Nessler tube and, was pre-dispersed in water by the addition of a portion of water. After that, water was added until the level of the content in the tube reached a 50 ml marked line. After the tube was vigorously shaken, the tube was allowed to stand for 5 minutes. The dispersing conditions thus obtained were visually inspected.

(2) Water Stability

The water stability was evaluated by using a test instrument illustrated in FIG. 1, wherein 11 is a measuring pipette, 12 is a rubber stopper, 13 is a constant temperture water bath and 14 is a sample. 20 g of the aluminum paste composition having a heating residue of 65% was collected in a 200 ml Erlenmeyer flask, and 100 ml of deionized water was added thereto. The flask was vigorously shaken to disperse the sample in water. To this flask, a measuring pipette 11 with a rubber stopper 12 was fitted and the flask was placed in a constant temperature water bath 13 having a temperature of 50° C. After the sample 14 was allowed to stand for 20 hours, gas generation condition was observed.

(3) Storage Stability

The aqueous aluminum paste composition was placed in a 500 ml glass vessel and stored for 6 months at room temperature. The dispersing condition of the aqueous aluminum paste composition was visually observed.

Properties of Coating Composition and Coating Derived Therefrom

Aqueous acrylic melamine resin coating compositions were prepared according to the following formulation and were examined to determine dispersing stability, storage stability and coating appearance.

| Composition | Parts |
| --- | --- |
| Aluminum Paste (heating residue = 65%) | 13.0 |
| Water-soluble Acrylic Resin (heating residue = 50%) | 370.0 |
| Water-soluble Melamine Resin (heating residue = 50%) | 100.0 |
| Deionized Water | 490.8 |
| Total | 973.8 |

(1) Dispersing Stability of Aluminum Paste

The aqueous metallic coating composition was allowed to stand for 3 months at a room temperature and the dispersing stability was evaluated according to a fineness-of-dispersion gauges-method, set forth in item 44 of JIS (Japanese Industrial Standard) K 5400.

(2) Gas Generation is Coating Composition 100 ml of the sample coating composition was collected in a 200 ml Erlenmyer flask and was allowed to stand for 20 hours, at a temperature of 50° C., in a test instrument illustrated in FIG. 1. The gas generation condition was visually observed.

(3) Coating Appearance

The coating compositions just after preparation and after storage for 3 months at room temperature were applied on substrates. The difference between the result and two coatings was visually inspected.

TABLE 1

| Example and Comparative Example | Sample No. | Formulation Condition | | | | | Property of Paste | | | Properties of Coating Composition and Coating | | |
|---|---|---|---|---|---|---|---|---|---|---|---|---|
| | | Surface Treatment | | Nonionic Surface Active Agent | | | Water*1 Dispersibility | Water*2 Stability (50° C. × 20 hrs) | Long-term*3 Storage Stability (R.T. × 6 months) | Dispersing*4 Stability of Aluminum Paste | Gas*2 Generation in Coating Composition | Change in*5 Coating Appearance |
| | | Kind of Phosphoric Ester | Addition Amount (parts) | Kind of Nonionic Surface Active Agent | Addition Amount (parts) | | | | | | | |
| Example 1 | 1 | Lauryl Phosphate | 0 | Polyoxyethylene (6 mol) Lauryl Ether | 3 | | ++ | -- | + | + | -- | -- |
| | 2 | Lauryl Phosphate | 0.05 | Polyoxyethylene (6 mol) Lauryl Ether | 3 | | ++ | - | + | + | - | - |
| | 3 | Lauryl Phosphate | 0.1 | Polyoxyethylene (6 mol) Lauryl Ether | 3 | | ++ | + | ++ | ++ | + | + |
| | 4 | Lauryl Phosphate | 1 | Polyoxyethylene (6 mol) Lauryl Ether | 3 | | ++ | ++ | ++ | ++ | ++ | ++ |
| | 5 | Lauryl Phosphate | 5 | Polyoxyethylene (6 mol) Lauryl Ether | 3 | | ++ | ++ | ++ | ++ | ++ | ++ |
| | 6 | Lauryl Phosphate | 10 | Polyoxyethylene (6 mol) Lauryl Ether | 3 | | ++ | ++ | ++ | ++ | ++ | ++ |
| | 7 | Lauryl Ether | 20 | Polyoxyethylene (6 mol) Lauryl Ether | 3 | | ++ | ++ | ++ | ++ | ++ | + |
| | 8 | Lauryl Phosphate | 30 | Polyoxyethylene (6 mol) Lauryl Ether | 3 | | ++ | ++ | ++ | ++ | ++ | + |
| | 9 | Lauryl Phosphate + Ammonium Hydroxide (pH = 7) | 5 | Polyoxyethylene (6 mol) Lauryl Ether | 3 | | ++ | ++ | ++ | ++ | ++ | ++ |
| | 10 | Tridecyl Phosphate | 5 | Polyoxyethylene (6 mol) Lauryl Ether | 3 | | ++ | ++ | ++ | ++ | ++ | ++ |
| | 11 | Nonyl Phenyl Ether Phosphate (Ethylene Oxide Addition Mol No. = 9) | 5 | Polyoxyethylene (6 mol) Lauryl Ether | 3 | | ++ | ++ | ++ | ++ | ++ | ++ |
| Comparative Example 1 | 12 | Triethyl Phosphate | 5 | Polyoxyethylene (6 mol) Lauryl Ether | 3 | | + | + | + | - | + | - |
| | 13 | Diethyl Phosphate | 5 | Polyoxyethylene (6 mol) Lauryl Ether | 3 | | + | + | + | - | + | - |
| | 14 | Diammonium Hydrogenphosphate | 5 | Polyoxyethylene (6 mol) Lauryl Ether | 3 | | + | + | + | - | + | - |

(Remarks)
*1 ++Excellent, +Good
*2 ++No Gas Generation, +Slight Gas Generation, −Relatively Much Gas Generation, −−Much Gas Generation
*3 ++No Change, +Slight Change in Water Dispersibility
*4 ++Excellent, +Good, −Slightly Aggregated
*5 ++No Change, +Slightly Darken, −Darken, −−Vigorously Darken

EXAMPLE 2 AND COMPARATIVE EXAMPLE 2

A mixture of 10 kg of particulate aluminum having an average particle size of approximately 50 microns and 10 kg of mineral spirit having a viscosity of approximately 1.17 Cps at 20° C. and containing 5% stearylamine was charged into a ball mill and, then, subjected to a ball milling for 6 hours. The milled mixture was diluted with 20 kg of mineral spirit and, then, charged into a slurry tank. This mixture was filtered with a filter press. The resultant filter press cake contained 96% of a heating residue and 4% of mineral spirit. The sieving residue of the aluminum powder in the filter press cake was less than 0.1% when the aluminum powder was sieved through a screen having an opening size of 149 microns.

To 100 arts of the filter press cake thus obtained, 3 parts of the compounds listed in Table 2 below, as an organic phosphoric ester, and 3 parts of polyoxyethylene (addition mol number=6), as a water dispersing agent, and water were added. The amount of water was such that a heating residue of the compositions was 65%. The mixtures were, then, uniformly kneaded at a temperature of 70° C. for approximately 3 hours. Thus, aqueous aluminum paste compositions were obtained.

As a comparative example, it was tried to prepare aqueous aluminum paste composition in a manner as described above, except that no organic phosphoric ester was used. However, just after the addition of water, gas was vigorously generated from the mixture, aqueous paste could not be obtained.

The aqueous aluminum paste compositions thus obtained were examined to determine the properties of the paste compositions and the properties of coating compositions containing the same in a manner as described in Example 1. The results are summarized in Table 2 below.

TABLE 2

| Example No. | Sample No. | Milling Metal | Milling Agent | Surface Treatment Kind of Phosphoric Ester | Addition Amount (parts) | Water Dispersing Agent Kind of Dispersing Agent | Addition Amount (parts) | Pasting Medium | Property of Paste Water* Dispersibility | Water* Stability (50° C. × 20 hrs) | Long-term* Storage Stability (R.T. × 6 Months) | Properties of Coating Composition and Coating Dispersing* Stability of Aluminum Paste | Gas Generation* in Coating Composition | Change* in Coating Appearance |
|---|---|---|---|---|---|---|---|---|---|---|---|---|---|---|
| Example 2 | 15 | Al | Stearyl Amine | Tridecyl Phosphate neutralized by Morpholine (pH=7) | 3 | Polyoxyethylene (6 mol) Lauryl Ether | 3 | Water | ++ | ++ | ++ | ++ | ++ | ++ |
| | 16 | Al | Stearyl Amine | Hexyl Phosphate | 3 | Polyoxyethylene (6 mol) Lauryl Ether | 3 | Water | ++ | + | ++ | ++ | ++ | ++ |
| | 17 | Al | Stearyl Amine | Octyl Phosphate | 3 | Polyoxyethylene (6 mol) Lauryl Ether | 3 | Water | ++ | + | ++ | ++ | ++ | ++ |
| | 18 | Al | Stearyl Amine | Stearyl Phosphate | 3 | Polyoxyethylene (6 mol) Lauryl Ether | 3 | Water | ++ | ++ | ++ | ++ | ++ | ++ |
| | 19 | Al | Stearyl Amine | Dococyl Phosphate | 3 | Polyoxyethylene (6 mol) Lauryl Ether | 3 | Water | ++ | ++ | ++ | ++ | ++ | ++ |
| | 20 | Al | Stearyl Amine | Stearyl Ether Phosphate (E.O. addition mol=6) | 3 | Polyoxyethylene (6 mol) Lauryl Ether | 3 | Water | ++ | ++ | ++ | ++ | ++ | ++ |
| | 21 | Al | Stearyl Amine | Octyl Phenyl Phosphate | 3 | Polyoxyethylene (6 mol) Lauryl Ether | 3 | Water | ++ | ++ | ++ | ++ | ++ | ++ |
| | 22 | Al | Stearyl Amine | Dodecyl Phosphate neutralized by Morpholine (pH=7) | 3 | Polyoxyethylene (6 mol) Lauryl Ether | 3 | Water | ++ | ++ | ++ | ++ | ++ | ++ |
| Comparative Example | 23 | Al | Stearyl Amine | — | — | Polyoxyethylene (6 mol) Lauryl Ether | 3 | Water | Since gas generation was very vigorous, evaluation test could not be carried out. | | | | | |

TABLE 2-continued

| | | Formulation Condition | | | | | | Property of Paste | | | Properties of Coating Composition and Coating | | |
|---|---|---|---|---|---|---|---|---|---|---|---|---|---|
| | | Milling | | Surface Treatment | | Water Dispersing Agent | | | | Water* Stability (50° C. | Long-term* Storage Stability (R.T. | Dispersing* Stability of Aluminum | Gas Generation* in Coating Composition | Change* in Coating Appearance |
| Example No. | Sample No. | Metal | Milling Agent | Kind of Phosphoric Ester | Addition Amount (parts) | Kind of Dispersing Agent | Addition Amount (parts) | Pasting Medium | Water* Dispersibility | 20 hrs) | × 6 Months) | Paste | | |
| 2 | | | | | | | | | | | | | | |

*Refer to Remarks of TABLE 1.

EXAMPLE 3 AND COMPARATIVE EXAMPLE 3

A mixture of 10 kg of particulate aluminum having an average particle size of approximately 80 microns and 10 kg of mineral spirit having a viscosity of approximately 1.17 Cps at 20° C. and containing 5% oleic acid was charged into a ball mill and, then, subjected to a ball milling for 8 hours. The milled mixture was diluted with 20 kg of mineral spirit and, then, charged into a slurry tank. This mixture was filtered with a filter press. The resultant filter press cake contained 96% of a heating residue and 4% of mineral spirit. The sieving residue of the aluminum powder in the filter press cake was less than 0.1% when the aluminum powder was sieved through a screen having an opening size of 149 microns.

To 100 parts of the filter press cake thus obtained, 3 parts of lauryl phosphate, as an organic phosphoric ester, and 3 parts of polyoxyethylene oleyl ether, as a water dispersing agent, and water were added. Water was added in such an amount that a heating residue of the composition was 65%. The mixture was then, uniformly kneaded at a temperature of 60° C. for approximately 1 hour. Thus, aqueous aluminum paste composition having a heating residue of 65% was obtained.

As a comparative example, an aqueous aluminum paste composition having a heating residue of 65% was prepared in a manner as described above, except that lauryl phosphate was not used.

The aqueous aluminum paste compositions thus obtained were examined to determine the properties of the paste compositions and the properties of coating compositions containing the same in a manner as described in Example 1. The results are summarized in Table 3 below.

EXAMPLE 4 AND COMPARATIVE EXAMPLE 4

A mixture of 10 kg of particulate aluminum having an average particle size of approximately 80 microns and 10 kg of mineral spirit having a viscosity of approximately 1.17 Cps at 20° C. and containing 5% polyoxyethylene (addition mol number 6) stearyl ether phosphate was charged into a ball mill and, then, subjected to a ball milling for 8 hours. The milled mixture was diluted with 20 kg of mineral spirit and, then, charged into a slurry tank. This mixture was filtered with a filter press. The resultant filter press cake contained 95% of a heating residue and 5% of mineral spirit. The sieving residue of the aluminum powder in the filter press cake was less than 0.1% when the aluminum powder was sieved through a screen having an opening size of 149 microns.

To the filter press cake thus obtained, ethyl cellosolve was added in such an amount that a heating residue was 65%. The mixture was, then, uniformly kneaded at a temperature of 40° C. for approximately 40 minutes. Thus, a water-dispersible aluminum paste composition was obtained.

As a comparative example, a water-dispersible aluminum paste composition having a heating residue of 65% was prepared in a manner as described above, except that oleic acid was used in lieu of the organic phosphoric ester in the milling step and that polyoxyethylene oleyl ether was used as a water dispersing agent.

The water-dispersible aluminum paste compositions thus obtained were examined to determine the properties of the paste compositions and the properties of coating compositions containing the same in a manner as described in Example 1. The results are summarized in Table 3 below.

EXAMPLE 5 AND COMPARATIVE EXAMPLE 5

A mixture of 15 kg of particulate zinc having an average particle size of approximately 40 microns and 10 kg of mineral spirit having a viscosity of approximately 1.17 Cps at 20° C. and containing, as an organic phosphoric ester, 5% polyoxyethylene stearyl ether phosphate (ethylene oxide addition mol number 6) was charged into a ball mill and, then, subjected to a ball milling for 8 hours. The milled mixture was diluted with 20 kg of mineral spirit and, then, charged into a slurry tank. This mixture was filtered with a filter press. The resultant filter press cake contained 90% of a heating residue and 10% of mineral spirit. The sieving residue of the zinc powder in the filter press cake was less than 0.1% when the zinc powder was sieved through a screen having an opening size of 149 microns.

To the filter press cake thus obtained, ethyl cellosolve was added in such an amount that a heating residue was 65%. The mixture was, then, uniformly kneaded at a temperature of 40° C. approximately 40 minutes. Thus, a water-dispersible zinc paste composition was obtained.

As a comparative example, an aluminum paste composition having a heating residue of 90% and a mineral spirit content of 10% was prepared in a manner as described above, except that oleic acid was used in lieu of the organic phosporic ester. The sieving residue of the zinc powder in the filter press cake was 1% or less when the powder was sieved through a screen having an opening size of 149 microns.

To 100 parts of the filter press cake thus obrained, 3 parts of polyoxyethylene oleyl ether, as a water dispersing agent, and ethyl cellosolve were added. The ethyl cellosolve was added in such an amount that a heating residue was 65%. The mixture was, then, uniformly kneaded at a temperature of 40° C. for approximately 40 minutes. Thus, zinc paste compositions were obtained.

The zinc paste compositions thus obtained were examined to determine the properties of the paste compositions and the properties of coating compositions containing the same in a manner as described in Example 1. The results are summarized in Table 3 below.

EXAMPLE 6 AND COMPARATIVE EXAMPLE 6

A mixture of 15 kg of particulate copper having an average particle size of approximately 60 microns and 10 kg of mineral spirit having a viscosity of 1.17 Cps at 20° C. and containing, as an organic phosphoric ester, 5% polyoxyethylene stearyl ether phosphate (an ethylene oxide addition mol number of 6) was charged into a ball mill and, then, subjected to a ball milling for 8 hours. The milled mixture was diluted with 20 kg of mineral spirit and, then, charged into a slurry tank. This mixture was filtered with a filter press. The resultant filter press cake contained 85% of a heating residue and 15% of mineral spirit. The sieving residue of the copper powder in the filter press cake was less than 0.1% when the copper powder was sieved through a screen having an opening size of 149 microns.

To the filter press cake thus obtained, ethyl cellosolve was added in such an amount that a heating residue of the composition was 65%. The mixture was, then, uniformly kneaded at a temperature of 40° C. for approximately 40 minutes. Thus a water-dispersible copper paste composition was obtained.

As a comparative example, a filter press cake having a heating residue of 85% and a mineral spirit content of 15% was obtained in a manner as described above, except that oleic acid was used in lieu of said organic phosphoric ester. The sieving residue was 1% or less when the copper powder was shieved through a screen having an opening size of 149 microns.

To 100 parts of the filter press cake thus obtained, 3 parts of polyoxyethylene oleyl ether, as a water dispersing agent, and ethyl cellosolve in such an amount that a heating residue of the composition was 65% were added. The mixture was, then, uniformly kneaded at a temperature of 40° C. for approximately 40 minutes. Thus, a copper paste composition having a heating residue of 65% was obtained.

The paste compositions prepared above were examined to determine the properties of the paste compositions and the properties of coating compositions containing the same in a manner as described in Example 1. The results are summarized in Table 3 below.

TABLE 3

| | | | | Formulation Condition | | | | | Property of Paste | | | Properties of Coating Composition and Coating | | |
|---|---|---|---|---|---|---|---|---|---|---|---|---|---|---|
| | | | | Surface Treatment | | Water Dispersing Agent | | | | Water* Stability | Long-term* Storage Stability | Dispersing* | Gas Generation* | Change* |
| Example No. | Sample No. | Milling Metal | Milling Agent | Kind of Phosphoric Ester | Addition Amount (parts) | Kind of Dispersing Agent | Addition Amount (parts) | Pasting Medium | Water* Dispersibility | (50° C. × 20 hrs) | (R.T. × 6 Months) | Stability of Aluminum Paste | in Coating Composition | in Coating Appearance |
| Example 3 | 24 | Al | Oleic Acid | Lauryl Phosphate | 3 | Oleyl Ether (E.O. Addition Mol No.=8) | 3 | Water | ++ | + | ++ | ++ | + | ++ |
| Comparative Example 3 | 25 | Al | Oleic Acid | — | — | Oleyl Ether (E.O. Addition Mol No.=8) | 3 | Water | ++ | —— | + | + | —— | —— |
| Example 4 | 26 | Al | Stearyl Ether Phosphate (E.O. Addition Mol No.=6) | — | — | — | — | Ethyl Cellosolve | ++ | ++ | ++ | ++ | ++ | ++ |
| Comparative Example 4 | 27 | Al | Oleic Acid | — | — | Oleyl Ether (E.O. Addition Mol No.=8) | 3 | Ethyl Cellosolve | ++ | —— | ++ | ++ | — | — |
| Example 5 | 28 | Zn | Stearyl Ether Phosphate (E.O. Addition Mol No.=6) | — | — | — | — | Ethyl Cellosolve | ++ | + | ++ | ++ | + | + |
| Comparative Example | 29 | Zn | Oleic Acid | — | — | Oleyl Ether (E.O. Addition Mol | 3 | Ethyl Cellosolve | ++ | —— | ++ | ++ | —— | —— |

TABLE 3-continued

| Example No. | Sample No. | Milling Metal | Milling Agent | Surface Treatment Kind of Phosphoric Ester | Addition Amount (parts) | Water Dispersing Agent Kind of Dispersing Agent | Addition Amount (parts) | Pasting Medium | Water* Dispersibility | Water* Stability (50° C. × 20 hrs) | Long-term* Storage Stability (R.T. × 6 Months) | Dispersing* Stability of Aluminum Paste | Gas Generation* in Coating Composition | Change* in Coating Appearance |
|---|---|---|---|---|---|---|---|---|---|---|---|---|---|---|
| Example 6 | 30 | Cu | Stearyl Ether Phosphate (E.O. Addition Mol No.=6) | — | — | — | — | Ethyl Cellosolve | ++ | ++ | ++ | ++ | ++ | ++ |
| Comparative Example 6 | 31 | Cu | Oleic Acid | — | — | Oleyl Ether (E.O. Addition Mol No.=8) | 3 | Ethyl Cellosolve | ++ | — — | ++ | ++ | — — | — |

*Refer to Remarks of TABLE 1.

EXAMPLE 7

Figure 2:
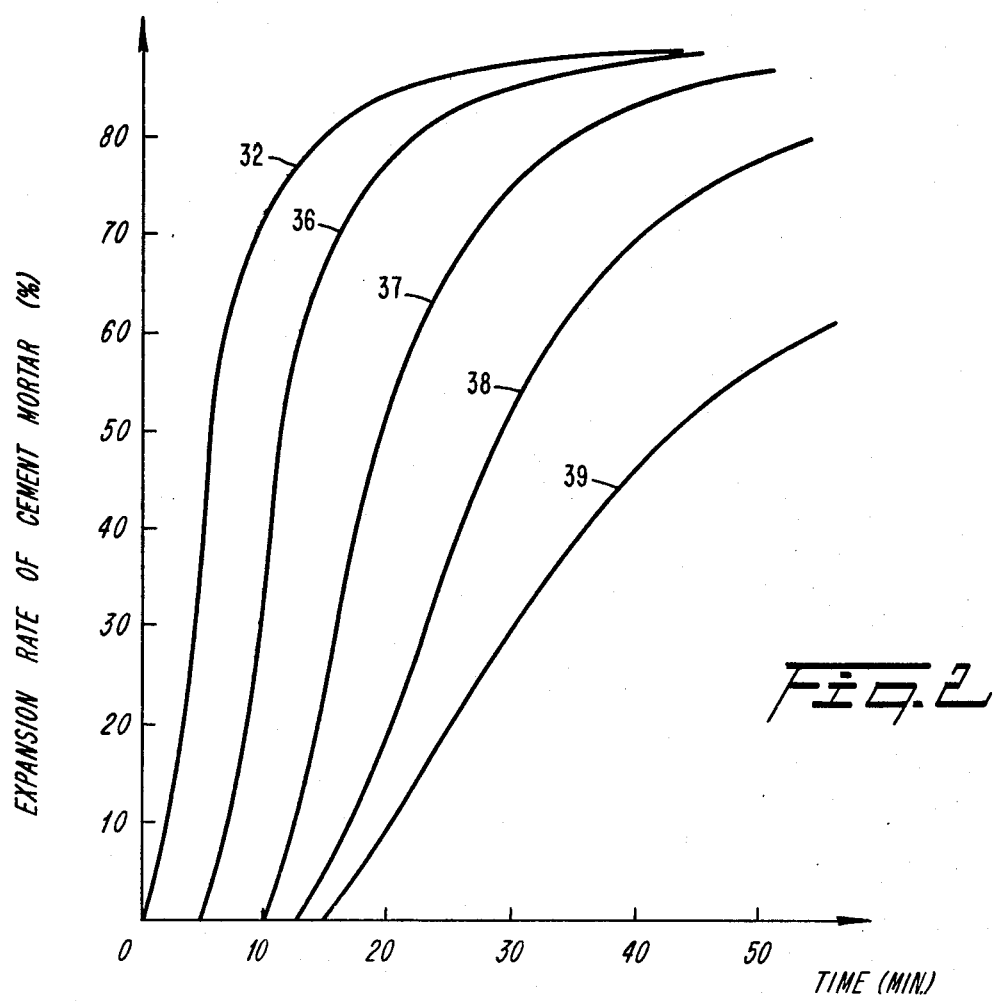
FIG. 2 is a graph illustrating expansion rates of various cement mortars including the paste compositions of metal powders.

To light-weight foamed concrete slurry containing 66 parts of quicklime powder (a sieving residue through a screen having an opening size of 88 microns of 3.2%), 204 parts of silica powders (sieving residues through screens having opening sizes of 88 microns and 44 microns are 30% and 45%, respectively) and 170 parts of water, 0.25 parts, in terms of pure aluminum, of the aqueous aluminum pastes obtained in Example 1 were added. The results are shown in Table 4 below and FIG. 2. In FIG. 2, expansion rate of the cement slurry or mortar is plotted as ordinate and the time of period after the addition of the aqueous aluminum paste is plotted as abscissa. The expansion rate is a percentage of expansion volume against the volume of the mortar before expansion.

TABLE 4

| No. | Organic Phosphoric Ester | Addition Amount of Phosphoric Ester Based On 100 Parts of Al Powder (Parts) | Sample No. of Aluminum Paste in Example 1 | Foam Initiating Time of Light-weight Foamed Concrete Slurry |
|---|---|---|---|---|
| 32 | Lauryl Phosphate | 0 | 1 | 0 |
| 33 | Lauryl Phosphate | 0.05 | 2 | 0 |
| 34 | Lauryl Phosphate | 0.1 | 3 | 0.2 |
| 35 | Lauryl Phosphate | 1 | 4 | 2 |
| 36 | Lauryl Phosphate | 5 | 5 | 5 |
| 37 | Lauryl Phosphate | 10 | 6 | 10 |
| 38 | Lauryl Phosphate | 20 | 7 | 13 |
| 39 | Lauryl Phosphate | 30 | 8 | 15 |
| 40 | Ethylene Oxide Addition Product of Nonyl Phenyl Ether Phosphate | 5 | 11 | 5 |
| 41 | Ammonia Neutralized Product of Lauryl Phosphate | 5 | 9 | 6 |
| 42 | Tridecyl Phosphate | 5 | 10 | 5 |

As is clear from the results shown in Table 4 and FIG. 2, in the case where a light-weight foamed concrete slurry (32) containing no organic phosphoric ester of the present invention in the aqueous aluminum paste compositions is used, the expansion rapidly occurs once after the addition of the aluminum paste composition and, after 5 minutes, the expansion volume reaches approximately a half of the expansion volume of the final product. Contrary to this, as the addition amount of the organic phosphoric ester increases, the initial foam initiating time is prolonged. Thus, the organic phosphoric esters used in the present invention clealy suppress the reaction of the aluminum paste. However, in the case where the amount of lauryl phosphate becomes as large as 30 parts in the slurry (39), the foaming efficiency is reduced.

As is clear from the results of this example, the addition of the aqueous aluminum paste composition of the present invention results in the fact that the expansion of the slurry or mortar by hydrogen gas can be retarded and, therefore, a light-weight foamed concrete can be advantageously produced, from a commercial point of view, even at a high temperature or even in the case where various quicklimes having the different calcination conditions are used.

We claim:
1. In the production of light-weight foamed concrete comprising mixing a concrete-forming composition and a foaming agent, and allowing the foamed concrete to set, the improvement which comprises employing, as said foaming agent, a water-dispersible aluminum paste composition comprising:
(a) aluminum powder, and;
(b) from 0.1 to 20% by weight, based on the weight of the aluminum powder, of at least one organic phosphoric ester having a general formula:

$$R-(OA)_m-O-\underset{\underset{R^2-O}{|}}{\overset{\overset{R^1-O}{|}}{P}}=O \qquad [I]$$

where R represents an alkyl group having 6 to 24 carbon atoms, an alkenyl group having 6 to 24 carbon atoms or an aryl group containing at least one alkyl substituent having 6 to 24 carbon atoms or at least one alkenyl substituent having 6 to 24 carbon atoms, A represents an alkylene group having 2 to 4 carbon atoms, m represents an integer of from 0 to 20, and $R^1$ and $R^2$ independently represent hydrogen, an alkyl group having 1 to 24 carbon atoms, an alkenyl group having 1 to 24 carbon atoms, an aryl group having 6 to 24 carbon atoms or $R-(OA)_m$ (R, A and m are the same as set forth above).

2. The process of claim 1, wherein said water-dispersible paste composition contains, as a pasting agent, from 5 to 50% by weight of water.

3. The process of claim 2, wherein the pH of said aluminum paste composition is within the range of from 3 to 9.

4. The process of claim 1, wherein said aluminum paste composition further comprises at least one nonionic surface active agent.

5. The process of claim 1, wherein said aluminum powder comprises aluminum flakes having a size such that the sieving residue through a screen having 149 micron sieve opening is 5% or less.

6. The process of claim 1, wherein the amount of the organic phosphoric ester is 1 to 10% by weight, based on the weight of aluminum powder.

7. The process of claim 1, wherein the organic phosphoric ester is an alkyl phosphoric ester.

8. The process of claim 18, wherein the alkyl phosphoric ester is a member selected from the group consisting of an alkyl phosphoric monoester, an alkyl phosphoric diester, and an alkyl phosphoric triester, which are octyl phosphate, nonyl phosphate, lauryl phosphate, tridecyl phosphate, stearyl phosphate, and the mixtures thereof.

9. The process of claim 4, wherein the nonionic surface active agent is a member selected from the group consisting of a polyoxyethylene alkyl ether, a polyoxyethylene alkyl phenol ether, a polyethylene glycol fatty acid ester, a sorbitan fatty acid ester, a fatty acid alkanol amide, a block copolymer of ethylene oxide and propylene oxide, and the mixtures thereof.

* * * * *

UNITED STATES PATENT AND TRADEMARK OFFICE
CERTIFICATE OF CORRECTION

PATENT NO. : 4,419,134
DATED : December 6, 1983
INVENTOR(S) : SHIZUO ISHIJIMA ET AL.

It is certified that error appears in the above—identified patent and that said Letters Patent is hereby corrected as shown below:

In the Abstract, line 20, change "having 2 to 24 carbon" to --having 1 to 24 carbon--.

Claim 1, line 7, after "formula" insert --[I]--.

Signed and Sealed this

Seventh Day of February 1984

[SEAL]

Attest:

GERALD J. MOSSINGHOFF

Attesting Officer

Commissioner of Patents and Trademarks